(12) United States Patent
Boissé et al.

(10) Patent No.: US 10,198,848 B2
(45) Date of Patent: Feb. 5, 2019

(54) APPARATUS AND METHOD OF IMAGE RENDERING

(71) Applicant: Sony Interactive Entertainment Inc., Tokyo (JP)

(72) Inventors: Guillaume Marie Boissé, London (GB); Richard Forster, London (GB)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/402,855

(22) Filed: Jan. 10, 2017

(65) Prior Publication Data

US 2017/0200301 A1   Jul. 13, 2017

(30) Foreign Application Priority Data

Jan. 13, 2016   (GB) .................................. 1600642.1

(51) Int. Cl.
| | |
|---|---|
| *G06T 17/00* | (2006.01) |
| *G06T 17/30* | (2006.01) |
| *G06T 15/00* | (2011.01) |
| *G06T 15/04* | (2011.01) |
| *G06T 17/05* | (2011.01) |
| *A63F 13/525* | (2014.01) |

(Continued)

(52) U.S. Cl.
CPC .......... *G06T 15/005* (2013.01); *A63F 13/525* (2014.09); *G06T 15/04* (2013.01); *G06T 15/80* (2013.01); *G06T 17/005* (2013.01); *G06T 17/05* (2013.01); *G06T 17/20* (2013.01); *G06T 2210/36* (2013.01)

(58) Field of Classification Search
None
See application file for complete search history.

(56) References Cited

U.S. PATENT DOCUMENTS

| | | | | |
|---|---|---|---|---|
| 2008/0147971 | A1* | 6/2008 | Hawkins ................. | A63F 13/00 711/113 |
| 2014/0325152 | A1* | 10/2014 | Taft ...................... | G06F 12/0875 711/122 |
| 2017/0316543 | A1* | 11/2017 | Pieters ...................... | G06T 1/60 |

FOREIGN PATENT DOCUMENTS

JP    11167646 A    6/1999

OTHER PUBLICATIONS

Lux C. et al: "GPU-Based Ray Casting of Stacked Out-of-Core Height Fields", Sep. 26, 2011, Network and Parallel Comp., Lecture Notes in Comp. Science, Springer Int. Pub., pp. 269-280.*

(Continued)

*Primary Examiner* — Martin Mushambo
(74) *Attorney, Agent, or Firm* — Matthew B. Dernier, Esq.

(57) ABSTRACT

A method of image rendering includes representing a height map of terrain elevation data as a virtual texture; sampling a portion of the height map terrain elevation data on a uniform grid corresponding to render nodes used for rendering a terrain mesh, where a correspondence of the grid to the render nodes results in the sampled terrain elevation data for a render node being entirely contained within one physical page of memory, and where the equivalent position of a heightmap virtual co-ordinate in a page of physical memory is obtained based upon an offset to a physical page co-ordinate, rather than by reference to an indirection texture; and rendering terrain mesh for a render node according to terrain elevation data obtained from a single physical page of memory corresponding to respective virtual co-ordinates.

16 Claims, 5 Drawing Sheets

(51) Int. Cl.
  *G06T 15/80* (2011.01)
  *G06T 17/20* (2006.01)

(56) References Cited

OTHER PUBLICATIONS

Igehy et al., "Prefetching in a Texture Cache Architecture", Aug. 31, 1998 Workshop on Graphics Hardware, Lisbon Portugal, ACM 1998, pp. 133-142.*
Search Report for corresponding GB application No. 1600782.5, 3 pages, dated Mar. 26, 2016.

* cited by examiner

*Figure 1a: Page size: 64
Page count: 16x16*

*Figure 1b: Page size: 128
Page count: 8x8*

*Figure 1c: Page size: 32
Page count: 32x32*

Figure 4a: Terrain mesh with no normal oversampling (one normal per vertex).
Physical texture size is 512x512 texels.
Heightmap size is 8192x8192 texels.

Figure 4b: Terrain mesh with 4 normals per vertex made available for lighting.
Physical texture size is 2048x2048 texels.
Heightmap size is 8192x8192 texels.

Figure 5

Figure 6a:
The original heightmap

Figure 6b:
The swizzled data for level 0

Figure 6c:
The swizzled data for level 1

APPARATUS AND METHOD OF IMAGE RENDERING

BACKGROUND OF THE INVENTION

Field of the Invention

The present invention relates to an apparatus and method of image rendering.

Description of the Prior Art

Many videogames are set in virtual environments that are intended to be photorealistic, or at least to provide a virtual environment whose display allows the player to suspend disbelief.

One property of such an environment is often the so-called draw distance; how far into the distance the virtual environment is rendered before terminating at a painted skyline or other non-interactive background, for example. The further the draw distance, and the further that the fidelity of the environment is preserved over that draw distance, then the more realistic the environment is perceived to be.

However, extending the draw distance and the fidelity of the environment to such distances places a corresponding computational and memory load on the videogame console. This makes it difficult to achieve or maintain a desired frame rate, such as the natural refresh rate of a display operating at 50 or 60 Hz. Consequently, 'draw distance' is often an adjustable parameter in games, particularly on PCs where the computational power of different PCs varies, and too large a draw distance can reduce the framerate of a game to unplayable levels.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY OF THE INVENTION

The present invention aims to address or alleviate the problem of maintaining frame rates and reducing memory costs when rendering detailed terrain over large draw distances.

In a first aspect, a method of image rendering is provided in accordance with claim 1.

In another aspect, an entertainment device is provided in accordance with claim 13.

Further respective aspects and features of the invention are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

An apparatus and method of image rendering are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an embodiment of the present invention, a virtual vertex texture along with nodes of index data are used to render a height-map based terrain geometry. Typically the virtual vertex texture is a regular texture, but virtualised as it is stored on disk, and accessed through a vertex shader as opposed to being sampled from a fragment shader. Typically the virtual texture is read back during the vertex stage of rasterizing a stream of indices in order to render a height-map based terrain geometry, as explained in more detail later herein.

The height information itself can take the form of a greyscale texture (for example 8 or 16 bits) providing a range of luminance values that are interpreted as height values with respect to a notional floor.

Figure 1A:
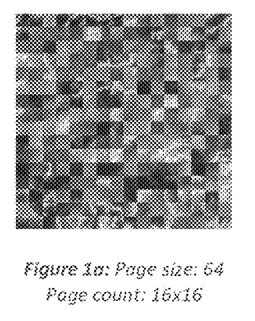
FIGS. 1a, 1b and 1c are diagrams of 2D tiles of texture data, in accordance with an embodiment of the present invention.
Figure 1B:
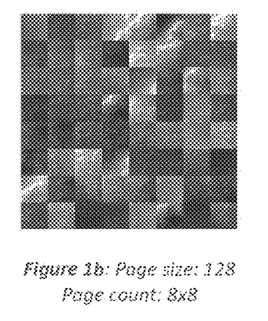
Figure 1C:
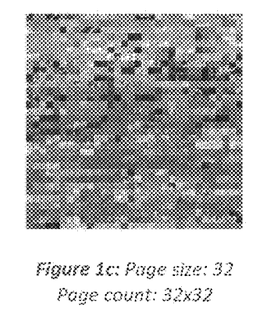

When rendering the terrain of a virtual environment, various levels of detail (LOD) of that terrain are streamed into a physical representation of the virtual texture (the virtual texture comprising texture data on disk) in the format of pages that are 2D tiles of texture data. Referring now to the drawings, wherein like reference numerals designate identical or corresponding parts throughout the several views, example pages are illustrated in FIGS. 1a, 1b and 1c. Page faults to request new data are raised as the viewer moves around the virtual environment mesh, necessitating rendering of new terrain, and a fail-safe mechanism allows using lower LOD information as a rendering fallback to avoid holes inside the virtual environment mesh while the requested data is being loaded from the virtual texture and into the physical representation.

Gathering Texture Information

For rendering, the terrain mesh is broken into a set of regular nodes that are referred to as render nodes, using a quadtree data structure that will be described later herein.

The nodes used for rendering the terrain mesh all have the same vertex resolution, but have a world size based on the resolution of the underlying data. This enables the entire terrain to be rendered with a single draw call where the nodes are instanced with auxiliary streams of per-node data, and this draw call can be generated from a GPU as an indirect draw call.

The height-map that is encoded inside the virtual texture can be sampled through a uniform grid, enabling it to be broken into squares corresponding to the render nodes. The amount of texture information in each square then corresponds to the level of detail.

It will be appreciated that a smaller number of vertices means less coverage per node, a finer control of the on-screen triangle distribution, but an increased number of draw calls (or instances in the case of instanced drawing), meanwhile a higher number of vertices means fewer draw calls, which can improve performance but at the cost of less precise control of the triangle distribution, since the nodes have more on-screen coverage, which can be bad for performance. Overall, a number providing a good balance between these competing requirements is 32.

Hence in an embodiment of the present invention a render node made of 32×32 quads will cover 32×32 texels of the height-map if the loaded data corresponds to the finest mip level (level 0), and will cover 64×64 texels if the loaded data corresponds to the next mip level (level 1), and so on. There may be any number of levels, although 8 levels may be typical. It will be appreciated that 32×32 etc., are nevertheless non-limiting example values.

Additionally a one or more texel border is added around each page, enabling a sharing of the vertex data at the edges of the render nodes. This allows bilinear filtering of the height information inside the fragment code when generating the terrain normals for shading.

By controlling the render node distribution, and due to the uniform structure that can be imposed upon the height-map, it is possible to ensure that a given render node has its elevation data entirely contained within one physical page of the virtual vertex texture. Because of this property, advantageously it is not necessary to maintain an indirection texture to perform a virtual-to-physical address translation onto the GPU. Instead we pass an offset and a ratio as uniform variables to be applied to the coordinates of the texture when sampling from the vertex texture. This significantly alleviates the cost of updating the virtual texture cache.

As a non-limiting example, the virtual texture may be 128,000 by 128,000 texels, but the physical texture (in video ram) is 4,000 by 2,000 texels. In order to read location 123,456×56,789 of the virtual texture, previously it was necessary to maintain an indirection texture that mapped the virtual texture to the physical texture. But by aligning node and texture data, it is possible instead to sample the physical cache using a pre-calculated 2D offset and a 2D ratio that are applied to these virtual coordinates in shader code; the equivalent physical memory position will then be (for example) 2,345×1,234.

In the above example, it will be appreciated that the 4,000 by 2,000 texel physical texture is the complete cache of physical pages used in the invention.

When interrogating the virtual texture system for some virtual coordinates, the system returns a result (e.g. no error, LOD warning, KNACK error) along with the 2D ratio and 2D offset. These are passed to the shader as uniform variables.

When sampling the physical texture, an example process (using GLSL syntax) would be as follows:

```
in vec2 VirtualTextureCoordinates;
uniform sampler2D PhysicalTexture;
uniform vec2 VirtualToPhysicalOffset;
uniform vec2 VirtualToPhysicalRatio;
// Entry point to the shader code.
void main( )
{
    vec4 textureSample = texture(PhysicalTexture,
VirtualTextureCoordinates * VirtualToPhysicalRatio +
VirtualToPhysicalOffset);
// Use that value, e.g. interpret it as some height information
}
```

Consequently the virtual coordinates (like 123,456×56,789 in the above example) are used directly in shader code when rendering. The texture( ) function is the built-in GLSL function for sampling a texture, and the 2D ratio and offset are applied to obtain co-ordinates that are appropriate to the PhysicalTexture 2D sampler, in which the texture is much smaller than the virtual texture and contains much less data (in the form of 2D tiles, or pages as referred to herein).

This approach works because for all the shader instances within a given draw call, it is known that all sampling instructions will lie in a single physical page (as described herein). If that was not the case, it would be necessary to jump to another physical location, which cannot be represented with just an offset and a ratio, but instead requires a full indirection texture.

In an embodiment of the present invention, the render node distribution is based on the distance of each node from the camera; the further it is, the coarser the data is. Once a list of nodes is gathered, they are iterated through and the virtual texture system is interrogated; there are then a couple of possible outcomes to the operation:

The data is in physical memory at the requested resolution, and no further action is required from a streaming point of view;

The data is not available in physical memory, but a lower LOD is. The lower LOD is used for rendering and a page fault is raised to start the streaming of the missing data;

The data is not available in physical memory, and no lower LOD is available. Nothing can be rendered for that node (there'll be a gap in the geometry) and a page fault is raised to stream the missing data.

The latter outcome can be avoided by specifying an amount of LODs to be loaded as fail-safe, as mentioned previously.

Hence in the present embodiment, advantageously there is no need to maintain an indirection texture. In an indirection texture as would be needed in a traditional virtual texturing; this is possible due to the highly predictable nature of a height-map, which can be considered as a flat plane with some height displacement.

The break-down of the nodes of the terrain mesh (into 2D squares of geometry) and the break down of the virtual texture pages (into 2D squares of texture data), can therefore be aligned so the geometry for a given draw call doesn't lie on more than one texture page.

There is therefore no need to allocate an extra storage for an indirection texture (which can consume a lot of memory resources) and also no need to update such an indirection texture (which can consume a lot of computation resources). In an indirection texture, the data at each point in the texture represents one virtual page of the virtual texture. Hence for example the data at a position X, Y in the indirection texture relates to a particular virtual page of the virtual texture, and may contain a texel value that indicates a page location for texture information and/or U, V texture coordinates, and/or a MIP map level (LOD) for the page. Because virtual textures may take the form of MIP maps, and each texel in the indirection texture corresponds to a page of the virtual texture, indirection textures may also take the form of MIP maps with each level corresponding to the equivalent level of the virtual texture. Also, of course, the overall size of the indirection texture scales with the size of the virtual texture. Hence whilst the virtual texture could become very large indeed because in practice it could be procedurally generated and hence it size does not correspond to its memory footprint, the indirection texture used to map to that virtual texture acts as a limiting factor because it does need to occupy physical memory (e.g. texture memory).

Consequently, avoiding the need for an indirection texture is most advantageous.

As noted previously, texture data at various levels of detail for the currently visible terrain needs to be streamed into physical memory, based on the virtual texture. Therefore to determine what texture data to obtain, the texture indices in the relevant nodes for the relevant levels of detail need to be gathered together.

Accordingly, the gathering of the nodes for rendering is performed using a quadtree-based recursive algorithm.

In a first step, the algorithm starts at the top node, which is the node that covers the whole terrain mesh, and follows the following sub-steps:

1.1. Check the node against the camera frustum, and cull it out if not visible.
1.2. Estimate the size of the node once projected onto the screen, based on the camera distance.
1.3. If the size is larger than a pre-defined threshold, return to step 1 for each of the 4 children of the current node.
1.4. Otherwise, add the node to the list of render nodes to be used.

Figure 2:
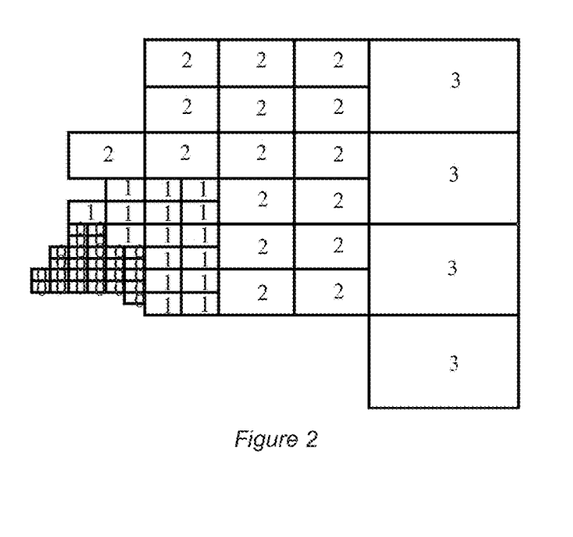
FIG. 2 is a schematic diagram of a list of render nodes gathered from a quadtree data structure, in accordance with an embodiment of the present invention.

FIG. 2 shows an example of a list of render nodes gathered from the quadtree data structure with their associated virtual mip level, from 0 to 3.

Once the list of render nodes has been gathered, we iterate through every node and ask the virtual texture layer for the virtual to physical translation values. This is done by going through each render node, and applying the following operations:

2.1. Check that the requested data is loaded into physical memory through looking up a page table.
2.2. If the data is loaded, it can be used for rendering, and the age of the page is updated so that it does not get evicted
2.3. If the data is not loaded, a coarser mip level can be used for rendering and return a LOD warning to the application; we update the age of the page so it does not get evicted, and we raise a/some page fault(s) to request the missing data.
2.4. If no LOD fallback is available, return nothing for rendering and a NACK error is sent back to the application. We raise a/some page fault(s) to request the missing data.

The gathering of the nodes and physical data check can optionally be moved to a compute process on a GPU which generates the page fault data for a CPU to handle.

Additionally, the virtual texture implementation can provide a parameter for setting a fail-safe count N that ensures that the levels from MIP to MIP+N are loaded for the requested virtual location. An example of this would be a fail-safe count of 2: if requested to load the location X, Y at mip level 1, the virtual texture would ensure that (X, Y, 1), (X, Y, 2), and (X, Y, 3) are loaded into physical memory, and/or that page faults are raised for this data to get loaded.

The page faults themselves can be prioritised as a function of the distance or position from the user's viewpoint, so that the potentially most obvious reductions in LOD are repaired more quickly.

If the page table is fully populated and new data still needs to be loaded, one or more resident pages can be removed and replaced with the new data as applicable using a least recently used (LRU) strategy based on the registered age of each page.

As described previously, it will be appreciated that the page table is used for the mapping between virtual coordinates and physical coordinates.

As illustrated previously, for example for a virtual texture that is 128,000 by 128,000 texels (on disk), and a physical texture that is 4,000 by 2,000 texels (in VRAM), then to read the location 123,456×56,789, this cannot directly be used to address the physical texture.

Therefore the page table receives these virtual coordinates, and provides an address translation, typically in the form of some 2D offset(s) and 2D ratio(s) to indicate that the corresponding position to read from in physical memory is, say, 2,345×1,234. In the third step, the adjacency between the render nodes is determined, and edge collapsing at each edge (north, south, west, east) is applied as required.

Edge collapsing information is masked into a 32-bits integer with each byte corresponding to one edge. The edge collapsing is then performed inside the vertex shader using this adjacency mask:

```
if(vertex.y == 0)        // north edge
    vertex.x &= (BlockAdjacencyMask >> 24) & 0xFF;
if(vertex.x == BlockSize)    // east edge
    vertex.y &= (BlockAdjacencyMask >> 16) & 0xFF;
if(vertex.x == 0)        // west edge
    vertex.y &= (BlockAdjacencyMask >> 8) & 0xFF;
if(vertex.y == BlockSize)    // south edge
    vertex.x &= BlockAdjacencyMask & 0xFF;
```

Figure 3:
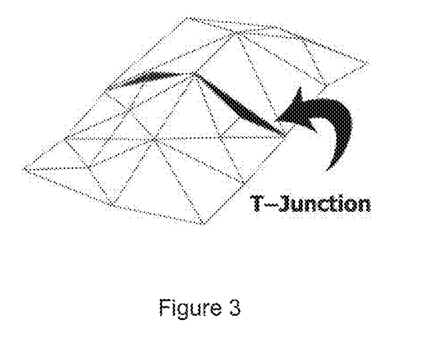
FIG. 3 is a schematic diagram illustrating a T-junction gap in a mesh.

Referring to FIG. 3, the edge collapsing is used to suppress vertices that would create T-junction gaps into the mesh when rendering, due to the difference in LODs between regions.

The fourth step, before sending the list of nodes out for rendering, is to optionally sort the render nodes based on the camera distance, to ensure front-to-back drawing order in order to reduce pixel overdraw. This may be done for example using the quicksort algorithm. The output of this is the list of draw calls, which can be indirectly drawn without CPU intervention.

It will be appreciated that the list of render nodes are the pieces of geometry that are actually rendered, and use the terrain shader code.

In order to improve the shading quality of the terrain mesh it is possible to set up the virtual texture to have a larger page size than the size of the render nodes, to enable oversampling.

One normal per vertex might not be sufficient to match the desired degree of visual fidelity, so by using oversampling, the normal density can be increased so there are 2, 4, 8, . . . normals per vertex available for lighting.

Figure 4A:
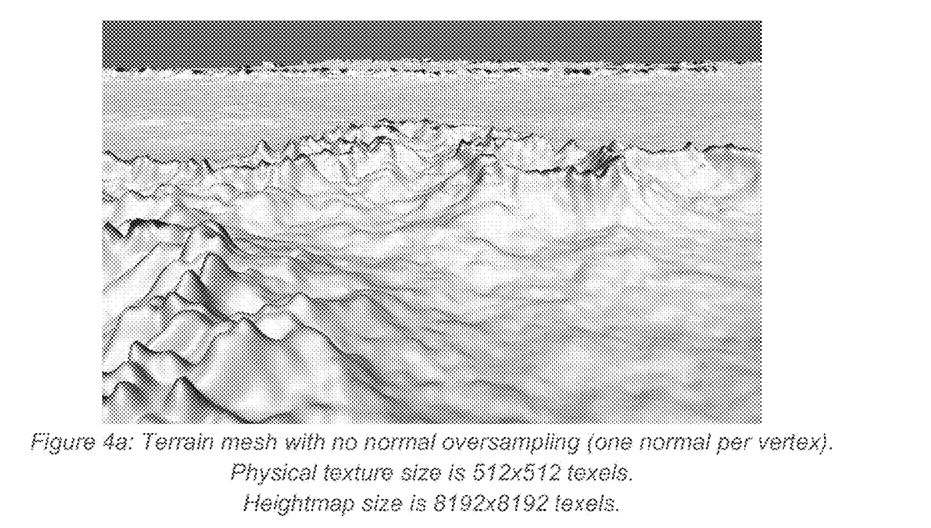
FIGS. 4a and 4b are diagrams of terrain mesh without and with oversampling, in accordance with an embodiment of the present invention.
Figure 4B:
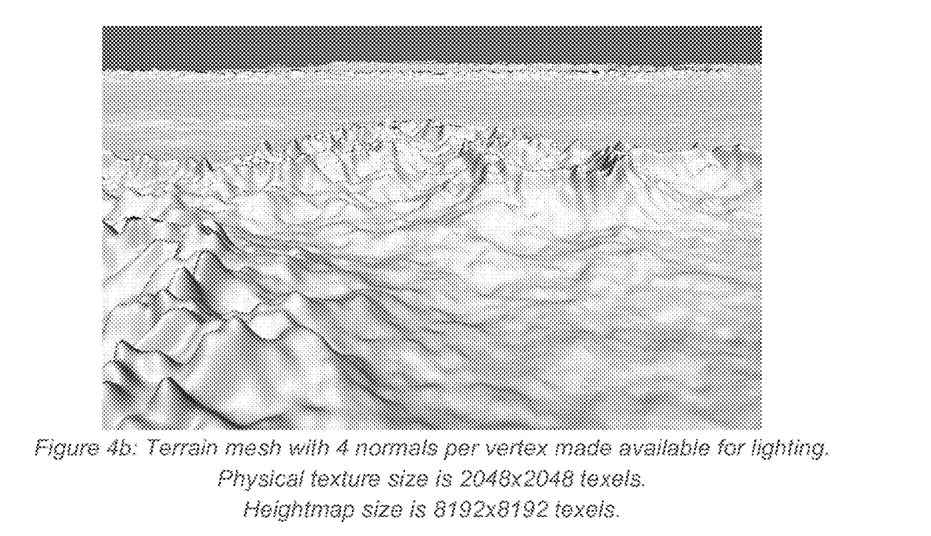

FIG. 4a shows a terrain geometry rendered with no oversampling, whilst FIG. 4b shows the same geometry with oversampling.

Terrain Texturing

The gathered list of render nodes is then re-used for performing another lookup onto another, different virtual texture or textures that is/are used for texturing (colouring) the terrain mesh.

In order to achieve a high degree of visual fidelity, preferably but optionally a texel resolution of 1 texel per millimeter may be used. Consequently if one individual quad on the terrain mesh covers roughly 1 meter by 1 meter of the virtual environment, then it is desirable to render 1024 by 1024 texels for the quads that are the closest to the camera.

Figure 5:
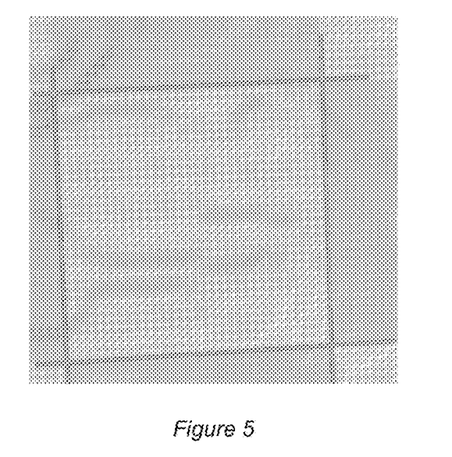
FIG. 5 is a diagram illustrating a single render node, in accordance with an embodiment of the present invention.

It will be understood that a node may be made of 32×32 quads. FIG. 5 illustrates a screenshot of a single render node (made of 32×32, 1024 quads or 2048 triangles). So in the case of FIG. 5 if there are 1024×1024 texels for a single quad (i.e. two triangles where graphics hardware only supports triangles and not quads), then for the whole node that is 32768×32768 texels.

These texels are used for the texturing (coloring). By contrast, for the heightmap, one height sample per vertex is enough as described previously herein.

However, for an 8 by 8 kilometers map, this would mean an 8388608 by 8388608 virtual texture (i.e. 256 terabytes of uncompressed data for an RGBA format). Consequently it is not practical to use a regular virtual texture. Rather, a procedural virtual texture is used instead.

A procedural virtual texture is procedurally generated as the user moves around and so is not stored on disk as data.

The procedural virtual texture is sampled in a similar manner to sampling of the virtual vertex texture. Page faults are raised when accessing unmapped texture regions, and these are processed through calling a page fault handler callback function.

When processing these page faults in the case of the procedural virtual texture, data is not read from disk directly, but instead sampled from a third and last virtual texture, hereafter referred to as a 'splatmap'.

The splatmap encodes the splatting information about how to combine different textures that is necessary to render the procedural texture from a set of tiled texture sources, and is authored by the texture artist. This map is fetched as a regular virtual texture, and typically has the same texel resolution than the texture of the heightmap.

The splatmap comprises mask information that is stored on disk that is used for splatting in the various texture sources (e.g. grass, rock, etc). The splatmap can be streamed, and that information is used to generate/render the pages of the procedural virtual texture. Once done, the terrain fragment shader samples the physical representation of the procedural virtual texture to get the colour value.

By sampling the splatmap while processing a page fault for the procedural texture, there is access to the splatting information for rendering the pages used for texturing the terrain mesh.

Once again, it is ensured that the texture information for a single draw call is contained within one page of the procedural virtual texture physical cache, so that there is no need to maintain an indirection texture.

To reach a resolution of 1024 by 1024 texels per quad for the highest level of detail, with a render node resolution of 32 by 32 quads, the pages inside the physical cache are at least 32768 by 32768 texels.

A typical count of pages would be 8×8 (i.e. 64) meaning the physical cache would be 262144 by 262144 texels (i.e. 256 gigabytes of uncompressed data for an RGBA format).

Consequently, in an embodiment of the present invention, the texel resolution of the procedural virtual texture is limited to 32 by 32 texels per quad. A typical cache resolution is then 8192 by 8192 texels (i.e. 256 megabytes of uncompressed data or 64 megabytes if using DXT5 compression).

Because of this, in order to achieve the preferred option of 1 texel per millimeter, the terrain mesh is separated into two segments depending on the distance of a render node to the camera, namely:

The near segment.

The far segment.

The near segment performs the texture splatting directly from the fragment shader as the mesh is being rendered. This operation can become very expensive if applied onto the full terrain mesh, but in this case is applied only to the first N meters of terrain surrounding the camera, where N may be a threshold distance that is for example in the range 5-100 meters, depending on the expected processing power of the host system. Because this step is not cached, but rather is performed every frame, it is not necessary to allocate any extra memory into the physical cache.

The splatting information is fetched from the splatmap virtual texture in the same way that it was fetched previously for rendering the pages of the procedural virtual texture.

The far segment samples the procedural virtual texture in a similar way to the sampling of the virtual vertex texture (i.e. passing an offset and a ratio as uniform inputs to the fragment shader). Because this data is cached, it is possible exploit the frame-to-frame coherency and avoid expensive texture splatting operations for the majority of the rendered terrain mesh.

Figure 6A:
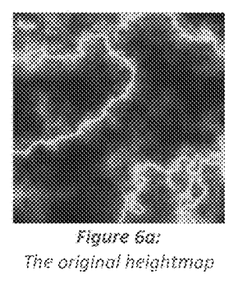
FIGS. 6a, 6b and 6c are diagrams illustrating swizzled height map data, in accordance with an embodiment of the present invention.
Figure 6B:
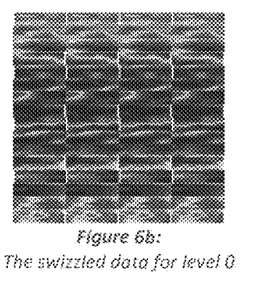
Figure 6C:
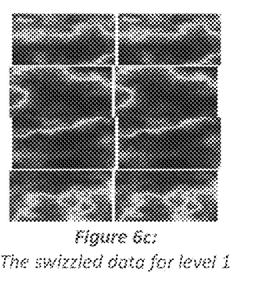

In order to improve data streaming performance, the virtual texture data can be swizzled according to the page format so that each requested page can be fully streamed in using a single disk read. FIGS. 6a-6c illustrate this for an example heightmap.

Hence, in summary, embodiments of the present invention allow for the rendering of arbitrary large heightmap-based terrain geometries in real time with high fidelity results while reducing memory cost. Several parts of the algorithm can be moved to a GPU compute unit to reduce the CPU impact of the implementation. Notably, by removing the need for an indirection texture, an increase in the effective area/size of the virtual texture does not result in a corresponding scale in consumption of physical memory.

Consequently the proposed technique is much more flexible/scalable in terms of controlling memory usage than, for example, geometry clipmapping, and is versatile in that it allows any arbitrary distribution of LOD patches over the terrain mesh, whereas a clipmap LOD distribution has to be centered on a given location (usually the viewer's point of view).

The technique is also very flexible in terms of memory usage; it is possible to increase the rendering quality incrementally by adding more memory (more and/or larger pages) and hence scales well to platforms that have a limited amount of memory.

Figure 7:
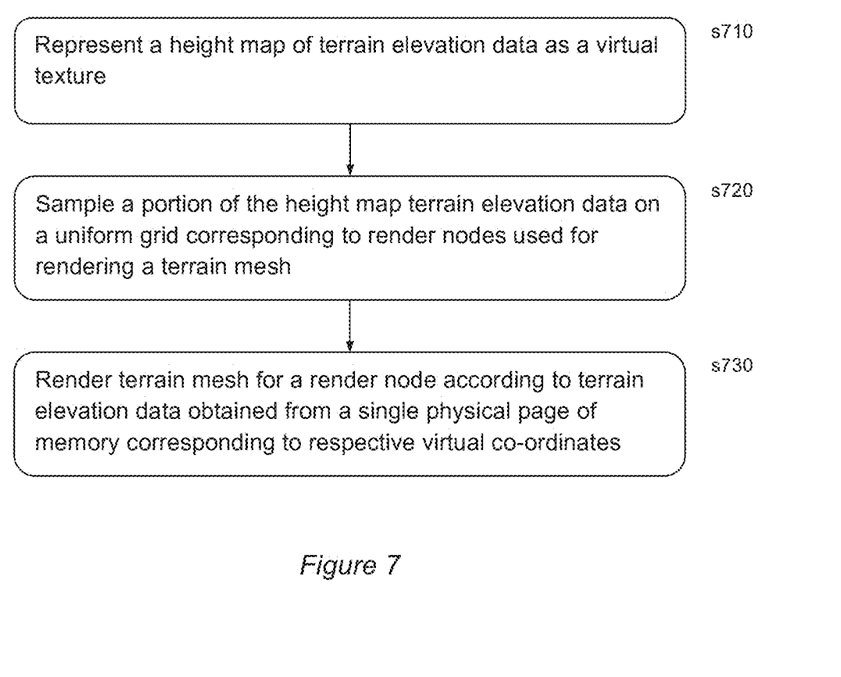
FIG. 7 is a flow chart of a method of image rendering, in accordance with an embodiment of the present invention.

Hence, referring now also to FIG. 7, in a summary embodiment of the present invention a method of image rendering comprises:

in a first step s710, representing a height map of terrain elevation data as a virtual texture;

in a second step s720, sampling a portion of the height map terrain elevation data on a uniform grid corresponding to render nodes used for rendering a terrain mesh;

wherein a correspondence of the grid to the render nodes results in the sampled terrain elevation data for a render node being entirely contained within one physical page of memory; and wherein the equivalent position of a heightmap virtual co-ordinate in a page of physical memory is obtained based upon an offset to a physical page co-ordinate, rather than by reference to an indirection texture; and in a third step s730, rendering terrain mesh for a render node according to terrain elevation data obtained from a single physical page of memory corresponding to respective virtual co-ordinates.

It will be apparent to a person skilled in the art that variations in the above method corresponding to operation of the various embodiments of the apparatus as described and claimed herein are considered within the scope of the present invention, including but not limited to:

the render nodes used for rendering the terrain mesh all having the same vertex resolution, but have a render size based upon the resolution of the texel data;

render nodes being gathered using a quad-tree recursive algorithm, this algorithm comprising the sub-steps of checking whether the render node will be visible for a virtual camera frustum; if so, estimate the size of the render node once projected onto the screen, based on camera distance; and if the size is smaller than a pre-defined threshold, add the node to the list of render nodes to be used; otherwise, repeat the sub-steps for each of the 4 children of the current render node;

when height map terrain elevation data at a first level of detail for a virtual location is requested to be loaded into physical memory, height map terrain elevation data for one or more coarser levels of detail for the same virtual location also being requested to be loaded into physical memory;

if expected height map terrain elevation data for a render node is not already available in physical memory, data corresponding to a coarser level of detail optionally being used, whilst sending a request for the expected height map terrain elevation data;

requests for expected height map terrain elevation data for plural render nodes being prioritised as a function of a distance or position from a user's viewpoint;

having a larger page size for the virtual texture than the size of the render nodes, oversampling the data from the virtual texture to obtain plural normals per vertex;

procedurally generating a virtual texture of decorative graphics for the terrain mesh;

in this case, the procedural virtual texture data for a single draw call being contained within one page of physical cache, and the equivalent position of a decorative texture virtual co-ordinate in a page of physical memory being obtained based upon an offset to a physical page co-ordinate, rather than by reference to an indirection texture; and separating the terrain mesh into a near segment and a far segment depending on the distance of a render node to a virtual camera; and only texturing the terrain mesh for the near segment by texture splatting directly from a fragment shader as the mesh is being rendered.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Figure 8:
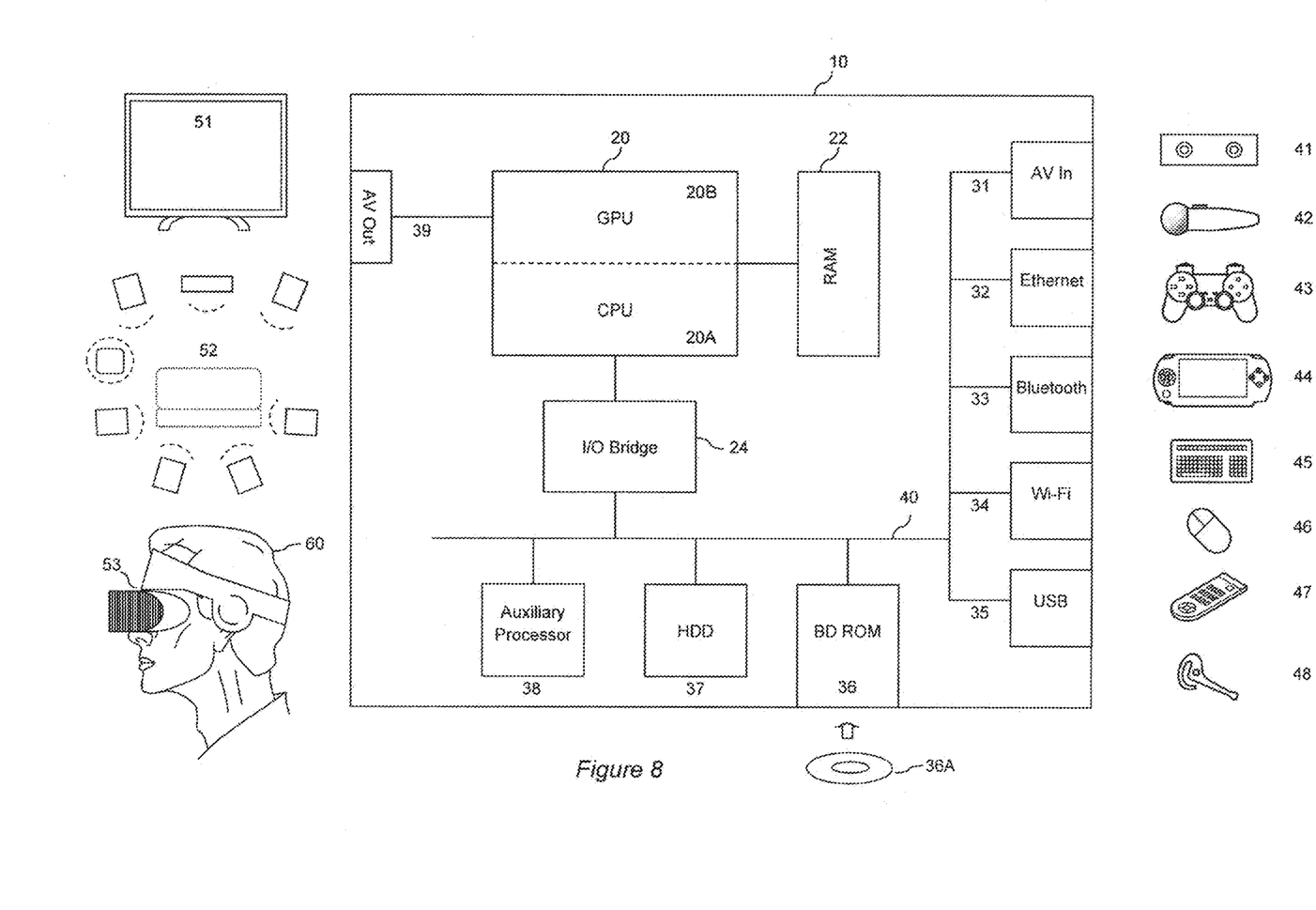
FIG. 8 is a schematic diagram of an entertainment device in accordance with an embodiment of the present invention.

Suitable conventional hardware may include an entertainment device, such as the Sony® PlayStation 4® entertainment device. FIG. 8 schematically illustrates the overall system architecture of a Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

It will be appreciated that references herein to texture data being accessed from disk are non-limiting; any suitable storage means with suitable capacity and access/read times may be considered, including solid state disk, RAM, ROM and network based storage. More generally, the storage means used will depend upon the host platform (e.g. an entertainment device such as the Sony PlayStation 4®).

Hence in a summary embodiment of the present invention, an entertainment device (such as the Sony PlayStation 4®) comprises storage means (such as RAM 22, hard disk 37, or network storage accessible via Wi-Fi® wireless link 34, Ethernet® port 32, or Bluetooth® wireless link 33), arranged to hold data representing a height map of terrain elevation data as a virtual texture; processing means (such as APU 20 and CPU 20A) arranged to sample a portion of the height map terrain elevation data on a uniform grid corresponding to render nodes used for rendering a terrain mesh; wherein a correspondence of the grid to the render nodes results in the sampled terrain elevation data for a render node being entirely contained within one physical page of memory (for example RAM 22); and wherein the equivalent position of a height map virtual co-ordinate in a page of physical memory of the entertainment device is obtained based upon an offset to a physical page co-ordinate, rather than by reference to an indirection texture; and rendering means (such as APU 20 and GPU 20B) arranged to render terrain mesh for a render node according to terrain elevation data obtained from a single physical page of memory corresponding to respective virtual co-ordinates.

In an instance of this summary embodiment, the processor is arranged to load height map terrain elevation data at a first level of detail for a virtual location from the storage means into physical memory, together with data for one or more coarser levels of detail for the same virtual location.

Similarly, in an instance of this summary embodiment, the terrain mesh is separated into a near segment and a far segment depending on the distance of a render node to a virtual camera, and the rendering means is arranged to only texture the terrain mesh for the near segment by texture splatting directly from a fragment shader as the mesh is being rendered.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of image rendering, comprising the steps of:
  representing a height map of terrain elevation data as a virtual texture;
  sampling a portion of the height map terrain elevation data on a uniform grid corresponding to render nodes used for rendering a terrain mesh, wherein a correspondence of the grid to the render nodes results in the sampled terrain elevation data for a render node being entirely contained within one physical page of memory, and wherein the equivalent position of a height map virtual co-ordinate in a page of physical memory is obtained based upon an offset to a physical page co-ordinate, rather than by reference to an indirection texture;
  rendering terrain mesh for a render node according to terrain elevation data obtained from a single physical page of memory corresponding to respective virtual co-ordinates, wherein render nodes are gathered using a quad-tree recursive algorithm; and
  checking whether the render node will be visible for a virtual camera frustum, and, if so, estimating the size of the render node once projected onto the screen, based on camera distance; and
  if the size is smaller than a pre-defined threshold, adding the node to the list of render nodes to be used, and otherwise, repeating the steps for each of the four children of the current render node.

2. The method according to claim 1, in which the render nodes used for rendering the terrain mesh all have the same vertex resolution, but have a render size based upon the resolution of the texel data.

3. The method according to claim 1, in which when height map terrain elevation data at a first level of detail for a virtual location is requested to be loaded into physical memory, height map terrain elevation data for one or more coarser levels of detail for the same virtual location is also requested to be loaded into physical memory.

4. The method according to claim 3, in which requests for expected height map terrain elevation data for plural render nodes are prioritised as a function of a distance or position from a user's viewpoint.

5. The method according to claim 1, in which if expected height map terrain elevation data for a render node is not already available in physical memory, data corresponding to a coarser level of detail may be used, whilst sending a request for the expected height map terrain elevation data.

6. The method according to claim 1, in which the virtual texture has a larger page size than the size of the render nodes, and the data is oversampled from the virtual texture to obtain plural normals per vertex.

7. The method according to claim 1, in which a virtual texture of decorative graphics for the terrain mesh is generated procedurally.

8. The method according to claim 7, in which
  the procedural virtual texture data for a single draw call is contained within one page of physical cache, and
  the equivalent position of a decorative texture virtual co-ordinate in a page of physical memory is obtained based upon an offset to a physical page co-ordinate, rather than by reference to an indirection texture.

9. The method according to claim 1, in which the terrain mesh is separated into a near segment and a far segment depending on the distance of a render node to a virtual camera; and only the terrain mesh for the near segment is textured by texture splatting directly from a fragment shader as the mesh is being rendered.

10. A non-transitory, computer readable storage medium having computer executable instructions adapted to cause a computer system to perform a method comprising the steps of:
  representing a height map of terrain elevation data as a virtual texture;
  sampling a portion of the height map terrain elevation data on a uniform grid corresponding to render nodes used for rendering a terrain mesh, wherein a correspondence of the grid to the render nodes results in the sampled terrain elevation data for a render node being entirely contained within one physical page of memory, and wherein the equivalent position of a height map virtual co-ordinate in a page of physical memory is obtained based upon an offset to a physical page co-ordinate, rather than by reference to an indirection texture;

rendering terrain mesh for a render node according to terrain elevation data obtained from a single physical page of memory corresponding to respective virtual co-ordinates, wherein render nodes are gathered using a quad-tree recursive algorithm; and checking whether the render node will be visible for a virtual camera frustum, and, if so, estimating the size of the render node once projected onto the screen, based on camera distance; and if the size is smaller than a pre-defined threshold, adding the node to the list of render nodes to be used, and otherwise, repeating the steps for each of the four children of the current render node.

11. An entertainment device, comprising:

a storage unit arranged to hold data representing a height map of terrain elevation data as a virtual texture;

a processor arranged to sample a portion of the height map terrain elevation data on a uniform grid corresponding to render nodes used for rendering a terrain mesh, wherein a correspondence of the grid to the render nodes results in the sampled terrain elevation data for a render node being entirely contained within one physical page of memory, and wherein the equivalent position of a height map virtual co-ordinate in a page of physical memory of the entertainment device is obtained based upon an offset to a physical page co-ordinate, rather than by reference to an indirection texture; and a rendering unit arranged to render terrain mesh for a render node according to terrain elevation data obtained from a single physical page of memory corresponding to respective virtual co-ordinates, wherein render nodes are gathered using a quad-tree recursive algorithm;

wherein the entertainment device checks whether the render node will be visible for a virtual camera frustum, and, if so, estimates the size of the render node once projected onto the screen, based on camera distance; and wherein if the size is smaller than a pre-defined threshold, the entertainment device adds the node to the list of render nodes to be used, and otherwise, repeats the steps for each of the four children of the current render node.

12. The entertainment device of claim 11, in which the processor is arranged to load height map terrain elevation data at a first level of detail for a virtual location from the storage unit into physical memory, together with data for one or more coarser levels of detail for the same virtual location.

13. The entertainment device of claim 11, in which the terrain mesh is separated into a near segment and a far segment depending on the distance of a render node to a virtual camera; and the rendering unit is arranged to only texture the terrain mesh for the near segment by texture splatting directly from a fragment shader as the mesh is being rendered.

14. A method of image rendering, comprising the steps of:

representing a height map of terrain elevation data as a virtual texture;

sampling a portion of the height map terrain elevation data on a uniform grid corresponding to render nodes used for rendering a terrain mesh, wherein a correspondence of the grid to the render nodes results in the sampled terrain elevation data for a render node being entirely contained within one physical page of memory, and wherein the equivalent position of a height map virtual co-ordinate in a page of physical memory is obtained based upon an offset to a physical page co-ordinate, rather than by reference to an indirection texture; and rendering terrain mesh for a render node according to terrain elevation data obtained from a single physical page of memory corresponding to respective virtual co-ordinates, wherein the terrain mesh is separated into a near segment and a far segment depending on the distance of a render node to a virtual camera, and wherein only the terrain mesh for the near segment is textured by texture splatting directly from a fragment shader as the mesh is being rendered.

15. A non-transitory, computer readable storage medium having computer executable instructions adapted to cause a computer system to perform a method comprising the steps of:

representing a height map of terrain elevation data as a virtual texture;

sampling a portion of the height map terrain elevation data on a uniform grid corresponding to render nodes used for rendering a terrain mesh, wherein a correspondence of the grid to the render nodes results in the sampled terrain elevation data for a render node being entirely contained within one physical page of memory, and wherein the equivalent position of a height map virtual co-ordinate in a page of physical memory is obtained based upon an offset to a physical page co-ordinate, rather than by reference to an indirection texture; and rendering terrain mesh for a render node according to terrain elevation data obtained from a single physical page of memory corresponding to respective virtual co-ordinates, wherein the terrain mesh is separated into a near segment and a far segment depending on the distance of a render node to a virtual camera, and wherein only the terrain mesh for the near segment is textured by texture splatting directly from a fragment shader as the mesh is being rendered.

16. An entertainment device, comprising:

a storage unit arranged to hold data representing a height map of terrain elevation data as a virtual texture;

a processor arranged to sample a portion of the height map terrain elevation data on a uniform grid corresponding to render nodes used for rendering a terrain mesh, wherein a correspondence of the grid to the render nodes results in the sampled terrain elevation data for a render node being entirely contained within one physical page of memory, and wherein the equivalent position of a height map virtual co-ordinate in a page of physical memory of the entertainment device is obtained based upon an offset to a physical page co-ordinate, rather than by reference to an indirection texture; and a rendering unit arranged to render terrain mesh for a render node according to terrain elevation data obtained from a single physical page of memory corresponding to respective virtual co-ordinates, wherein the terrain mesh is separated into a near segment and a far segment depending on the distance of a render node to a virtual camera, and wherein the rendering unit is arranged to only texture the terrain mesh for the near segment by texture splatting directly from a fragment shader as the mesh is being rendered.

\* \* \* \* \*